United States Patent
Alliman

(10) Patent No.: US 7,761,952 B2
(45) Date of Patent: Jul. 27, 2010

(54) AUTO WINDOW SIDE-WIPER AND WASHER SYSTEM

(76) Inventor: Mark C. Alliman, 7723 Sonibell Dr., Tamarac, FL (US) 33321

( * ) Notice: Subject to any disclaimer, the term of this patent is extended or adjusted under 35 U.S.C. 154(b) by 775 days.

(21) Appl. No.: 11/681,062

(22) Filed: Mar. 1, 2007

(65) Prior Publication Data

US 2007/0204421 A1 Sep. 6, 2007

Related U.S. Application Data

(60) Provisional application No. 60/778,875, filed on Mar. 3, 2006.

(51) Int. Cl.
B60S 1/56 (2006.01)
B60S 1/24 (2006.01)
B60S 1/08 (2006.01)
B60S 1/26 (2006.01)

(52) U.S. Cl. ............... 15/250.05; 15/250.21; 15/250.3; 15/250.37

(58) Field of Classification Search ............... 15/250.37, 15/250.3, 250.31, 250.1, 250.21, 250.05
See application file for complete search history.

(56) References Cited

U.S. PATENT DOCUMENTS

| | | | |
|---|---|---|---|
| 4,527,301 A | 7/1985 | Seitz | |
| 4,736,485 A | 4/1988 | Egner-Walter et al. | |
| 5,140,241 A | 8/1992 | Kobayashi | |
| D331,556 S | 12/1992 | Ismert | |
| 5,410,774 A | 5/1995 | Adams | |
| 5,647,086 A | 7/1997 | Gold | |
| 5,884,357 A * | 3/1999 | Schill et al. ............... | 15/250.21 |
| 6,634,054 B2 * | 10/2003 | Kuehbauch ............... | 15/250.21 |
| 6,775,878 B2 * | 8/2004 | Heinrich et al. ........... | 15/250.21 |
| 2006/0064837 A1 | 3/2006 | Mayo | |

FOREIGN PATENT DOCUMENTS

| | | |
|---|---|---|
| CN | 1817701 A | 8/2006 |
| DE | 3914813 A1 | 12/1990 |
| DE | 19755068 A1 | 6/1999 |
| JP | 2-77347 | 3/1990 |

* cited by examiner

*Primary Examiner*—Gary K Graham
(74) *Attorney, Agent, or Firm*—Santucci, Priore & Long, P.L.; Philip Vales

(57) ABSTRACT

An auto side-window washing system includes a worm gear having a spiral surface, the gear having a rotational output of a reciprocating wiper motor. The system also includes a spiral gear rotationally secured to a pivot point on a system platform, the gear having a cylindrical surface proportioned for complemental engagement with the spiral surface of the worm gear, a first rigid linear element is secured to the spiral gear along a radius. A wiper arm is provided that includes a first end and a second end, the second end pivotally secured at an outer end of the rigid element. Also provided is a second rigid linear element having a first end and a second end which end is pivotally secured to the wiper arm at a distance from its end generally equal to a length of the second linear element. An auto window wiper blade is pivotally coupled at about a middle of the wiper arm.

20 Claims, 10 Drawing Sheets

AUTO WINDOW SIDE-WIPER AND WASHER SYSTEM

REFERENCE TO RELATED APPLICATION

This application claims the benefit under 35 USC 119(e) of the provisional patent application Ser. No. 60/778,875, filed on Mar. 3, 2006, which is hereby incorporated by reference in its entirety.

FIELD OF INVENTION

The present invention relates to a vehicle side window wiper system.

BACKGROUND OF THE INVENTION

The use of wipers is known in the prior art. More specifically, wipers heretofore devised and utilized for the purpose of cleaning moisture from a section of glass material are known and consist basically of familiar, expected and obvious structural configurations. More particularly, the prior art specific to side windows is limited and includes a portable vehicle window wiper, U.S. Pat. No. 5,410,774 (1995) to Adams and a spare wheel carrier-mounted rear window wiper, U.S. Pat. No. 5,647,086 to Gold. It would be desirable to provide a permanent side-window wiper to clean moisture from a side window. The present invention addresses this long felt need in the art.

Another patent of interest is U.S. Pat. No. 4,527,301 (1985) to Seizt which teaches a side view mirror truck windshield wiper for extended side view mirrors on trucks or the like. The windshield wiper utilizes a pneumatic cylinder supported on a wiper support frame to effect a reciprocal movement of a wiper blade connected thereto. The wiper support frame is connected with the mirror in a co-planar relation and may be used as a handle to adjust the mirror as the mirror and wiper support frame are secured together as a unit.

Other known prior art wipers include U.S. Pat. No. 4,736,485 (1988) to Egner-Walter et al., U.S. Pat. No. 5,140,241 (1992) to Kobayashi; and Design U.S. Pat. No. 331,556 (1992) to Ismert.

While these devices fulfill their respective, particular objectives and requirements, the aforementioned patents do not disclose a window wiper for attachment to a vehicle door to reciprocally clear moisture from an adjacent window that includes a housing having a bracket projecting therefrom which may be inserted between a base of the window and an adjoining portion of the vehicle door, with an electric motor operable to reciprocate a wiper arm and its associated windshield wiping blade across the window.

In these respects, the vehicle window wiper according to the present invention substantially departs from the conventional concepts and designs of the prior art, and in so doing provides an apparatus primarily developed from the purpose of reciprocally cleaning and clearing moisture from an adjacent window.

SUMMARY OF THE INVENTION

A side-window washing system including a worm gear having a spiral surface, the gear rotationally secured about an axis thereof, and means for reciprocating of the direction of rotation of said axis of said worm gear, such as a reciprocating motor. The side-window washing system also includes a spiral gear rotationally secured to a pivot point and having a surface proportioned for complemental engagement with said spiral surface of said worm gears and a first linear rigid element secured to said spiral gear along a radius thereof. A wiper arm having second end and a second end has said first end pivotally secured at an outer end of said first linear element. The system also includes a second linear rigid element having a first end and a second end, the second end pivotally secured to said wiper arm at a distance from its end about equal to a length of said second linear element. A wiper blade is pivotally secured to said wiper arm.

It is an object of the invention to provide a side-window wiper and washer system for cleaning moisture from the side window of a vehicle.

It is another object is to provide a side-window wiper and washer system which may be easily and efficiently manufactured and marketed.

It is therefore an object of the present invention to provide a new portable vehicle window wiper apparatus which has many of the advantages of the wipers mentioned heretofore and many novel features that result in a portable vehicle window wiper which is not anticipated, rendered obvious, suggested, or even implied by any of the prior art wipers, either alone or in any combination thereof.

The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
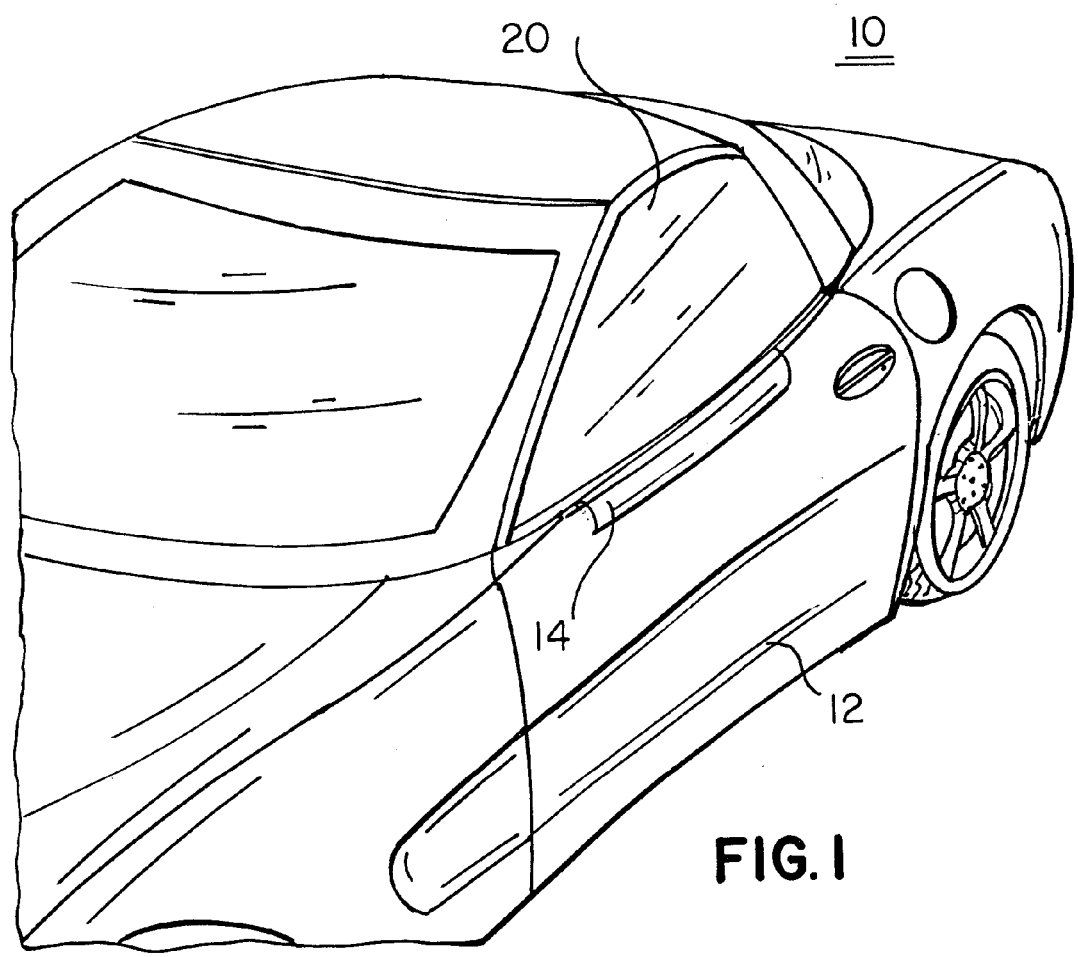
FIG. 1 is a perspective view of a side door portion of a motor vehicle showing the location and position of the inventive side-window washing system.
Figure 2:
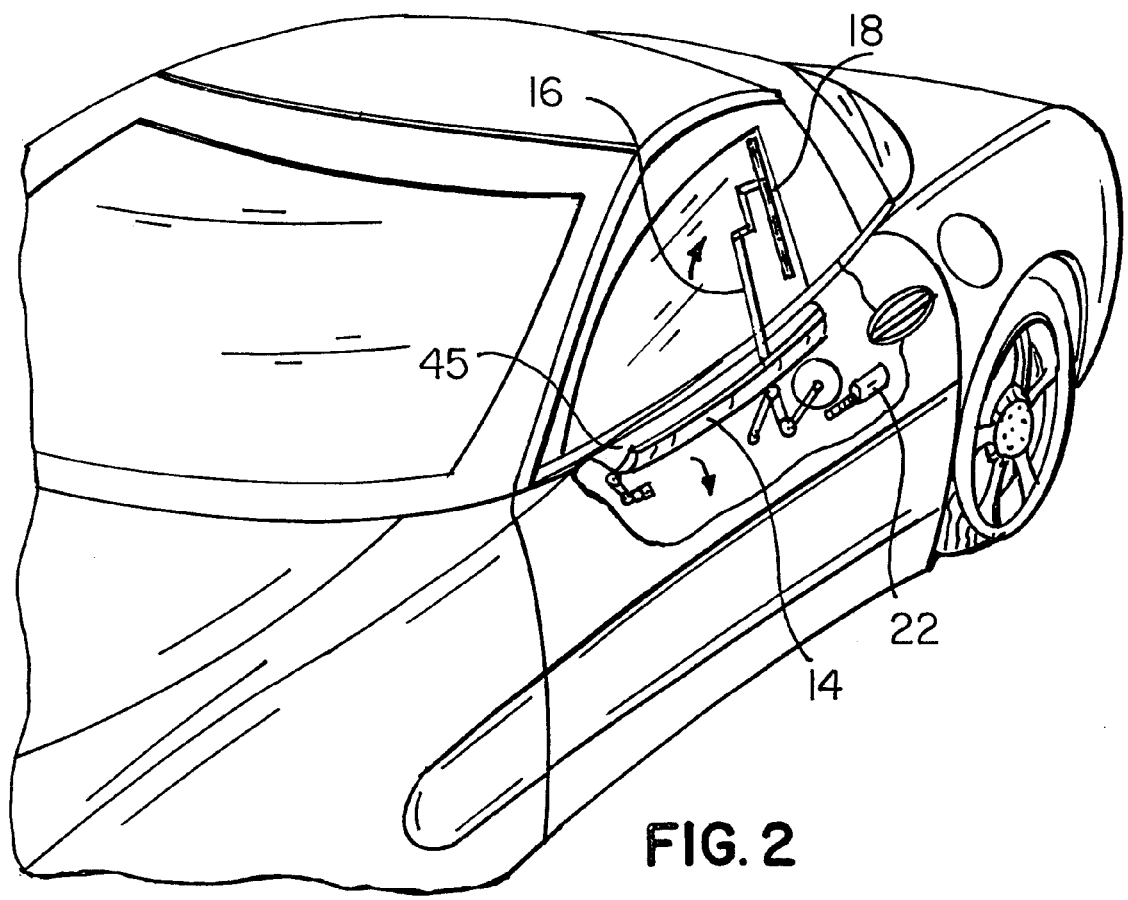
FIG. 2 is a schematic perspective view showing extension of the wiper already from a side door compartment.

With reference to the perspective view of FIG. 1, there is shown an otherwise conventional automobile 10 which, within a side door 12 (typically at the driver side), is provided a hinged panel 14 within which is housed the side-window washing system of the present invention. When said panel is opened (see FIG. 2), a wiper arm 16 and wiper blade 18 may extend therefrom for use upon side window 20. That is, in FIG. 2 is shown the open panel 14 from which said wiper arm 16 and wiper blade 18 have been released.

Figure 3:
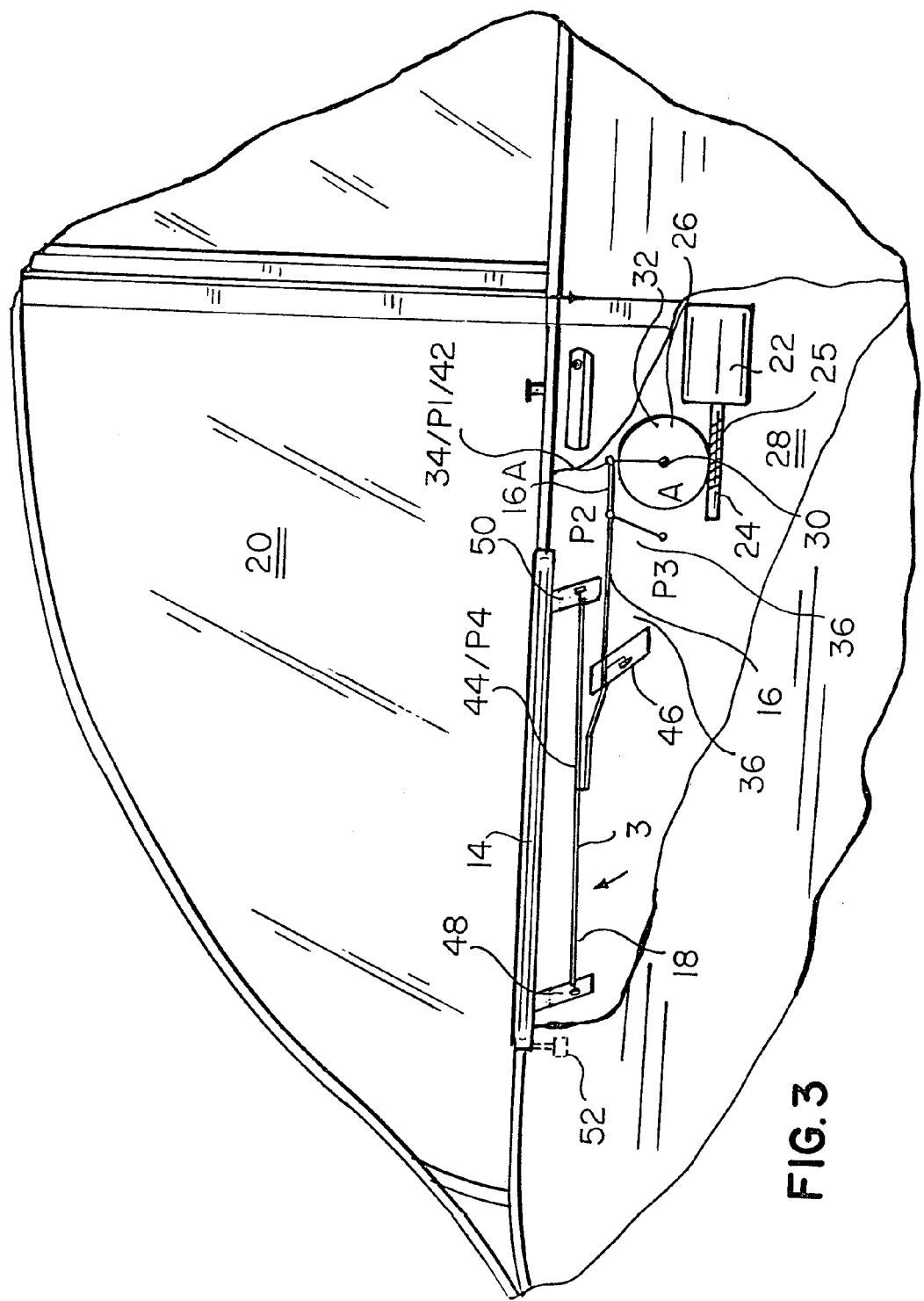
FIG. 3 is a first sequential schematic view of the gear train and wiper arm/blade assembly.

The operative mechanism of the inventive side-window washing system may, more particularly, be seen in FIG. 3 to include a motor 22 having, as an axial power output thereof, a worm gear 24 which includes a spiral gear surface 25. It is noted that wiper motor 22 includes means, such as appropriate electrical windings, to effect a cyclically reciprocating rotation of the output thereof. As such, wiper motor 22 may be a conventional reciprocating motor. In mechanical communication with said spiral surface 25 of worm gear 24 is a spiral gear 26 which is axially secured at axle 30 for axial rotation. The gear surface of spiral gear 26 is proportioned for complemental engagement with said spiral gear surface 25 of worm gear 24.

Figure 4:
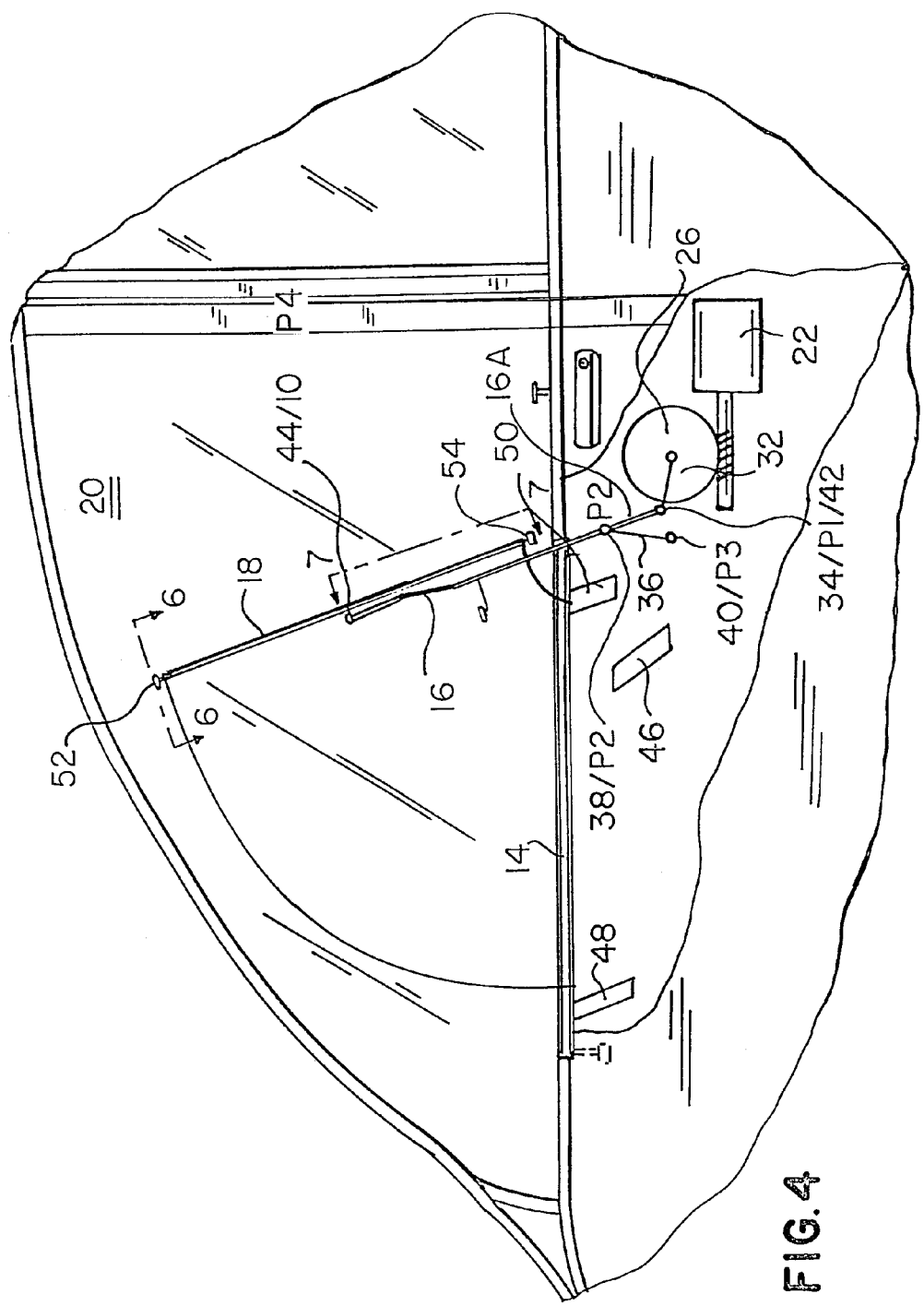
FIG. 4 is a view sequential to that of FIG. 3.
Figure 5:
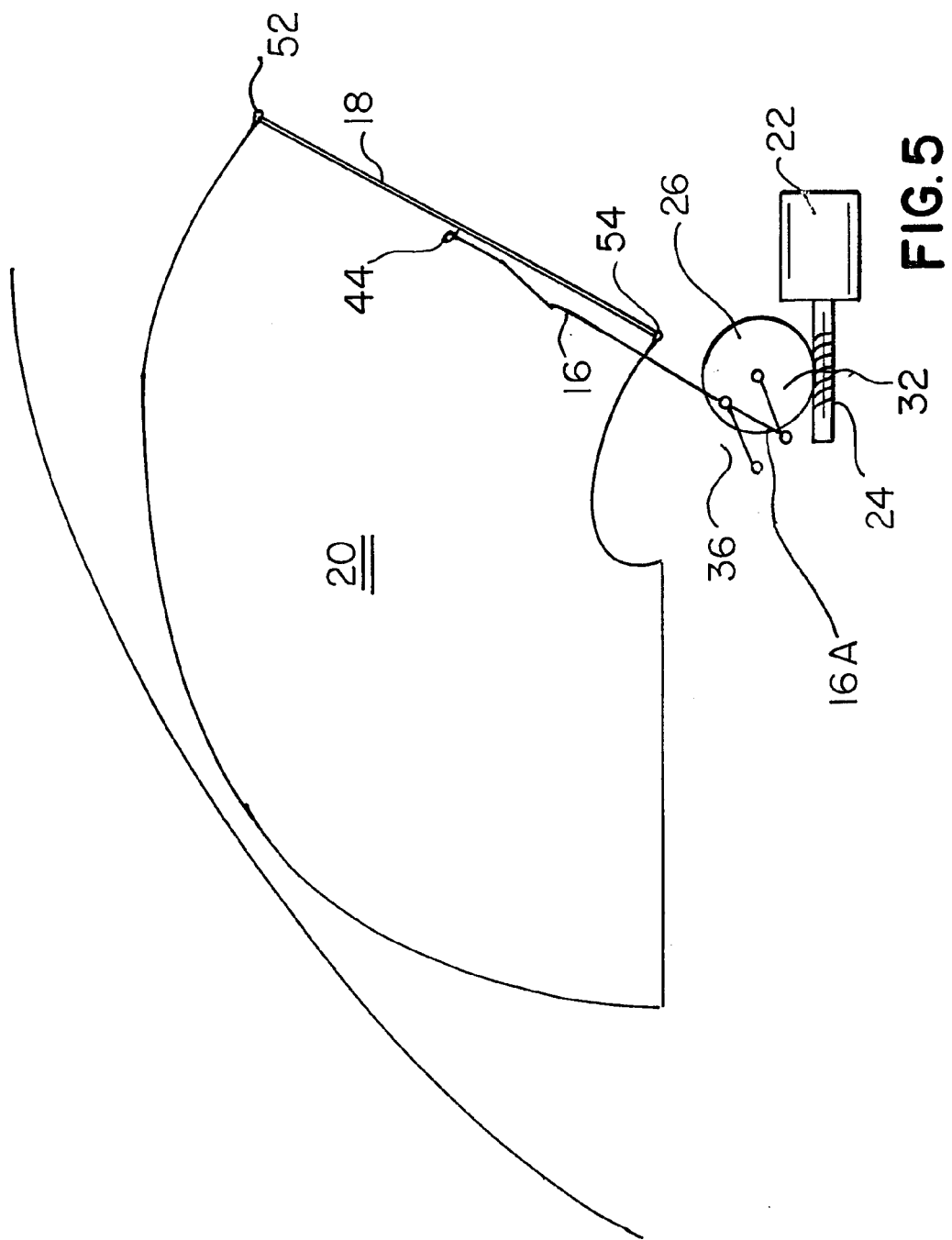
FIG. 5 is a view sequential to that of FIG. 4.

On a radius of said gear 26 is secured a first rigid linear element 32 having an outer end 34 which is also a pivot point (P1) of the inventive system. As may be noted in a comparison of the views of FIGS. 3 and 4, in the latter wiper arm 16 in rotated a clockwise direction but pivot point (P1) has rotated counterclockwise from the 12:00 o'clock to almost the 3:00 o'clock position. Therewith, a second rigid linear element 36 has achieved an acute angle relative to a line defined by wiper arm 16 and element 32, this by virtue of the action of a second pivot point 38, also referred to herein as a pivot point (P2), and a fixed pivot point 40, also referred to herein as (P3). Between P1 and P2 is segment 16A of wiper arm 16. As such, a scissors effect is caused by rigid elements 32 and 36 about pivot (P2) which define a fulcrum of the scissors effect occurring when spiral gear 26 rotates in the counterclockwise position, as shown in FIG. 4 relative to FIG. 3, and also in FIG. 5 relative to FIG. 4. In this mechanism, segment 16A is preferable equal in length to second element 36, and first element 32 equal in length to second element 36.

It is noted that said wiper arm 16 includes a first end 42 which exists at pivot point (P1) and a second end 44 which also constitutes a further pivot point (P4) upon which wiper arm 16 is connected to wiper blade 18. As may be noted in the sequential views of FIGS. 3, 4 and 5, the counterclockwise motion of spiral gear 26 results in a clockwise motion of wiper arm 16 and, thereby, of wiper blade 18 relative to side window 20.

Figure 6:
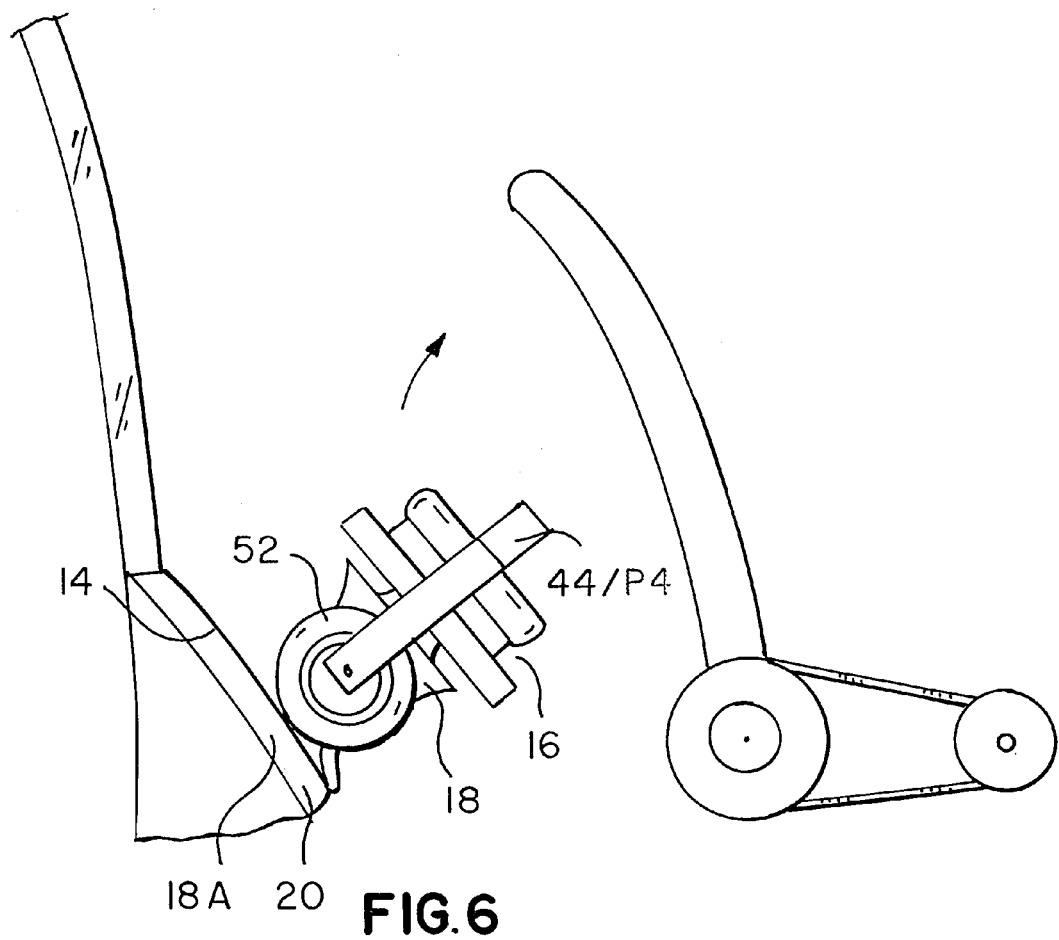
FIG. 6 is a cross-sectional view taken along Line 6-6 of FIG. 4.

Stability of the inventive system relative to the system platform 28 and within a region 45 beneath panel 14 is achieved by a first bracket or bridge 46 (see FIGS. 3, 4 and 6) that provides a securement and rest location for wiper arm 16 when the side window cleaning system is not in use. Similarly, there are provided brackets or bridges 48 and 50 which hold respective ends of wiper blade 18 when it is stored within compartment 45 within side door 12.

Movement of wiper blade 18 across side window 20 is facilitated by wheels 52 and 54 which function to preclude scratching of window 20 and to afford a more uniform movement of wiper blade 18 against the window 20. This function of wheels 52 and 54 relative to blade 18 and window 20 may be more fully appreciated with reference to FIG. 6 which is a view taken along Line 6-6 of FIG. 4. Therein may be seen wiper blade roller 52, wiper blade 18, including its point of contact 18A with glass 20, and pivot point 44 (P4) which connects arm 16 to wiper blade 18. As may be noted in FIG. 6, wiper blade 18 will typically have a distinct triangular cross-section in which an apex 1 thereof comprises said point of contact 18A with glass 20.

Figure 7:
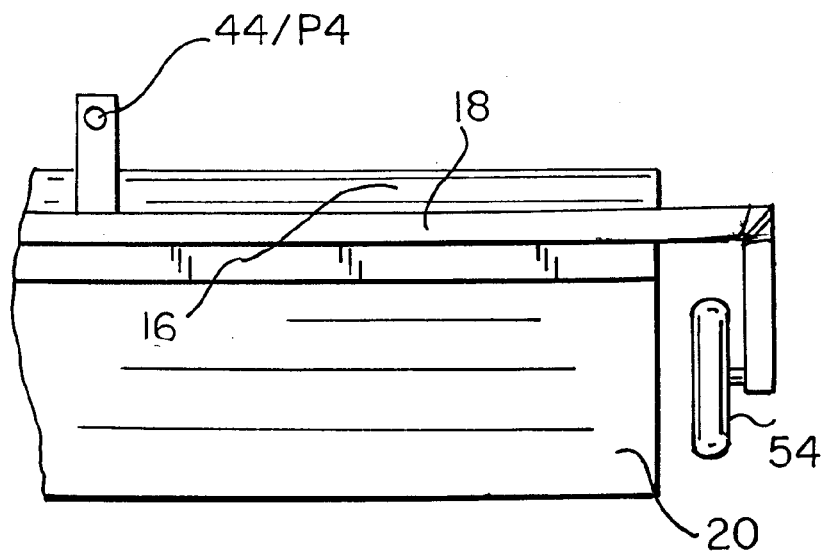
FIG. 7 is a cross-sectional view taken along Line 7-7 of FIG. 4.

In FIG. 7 is shown the relationship between wiper arm 16, wiper blade 18, wiper blade roller 54 and pivot point 44/P4 which, as above noted, pivotally secures wiper arm 16 to wiper blade 18.

Figure 8:
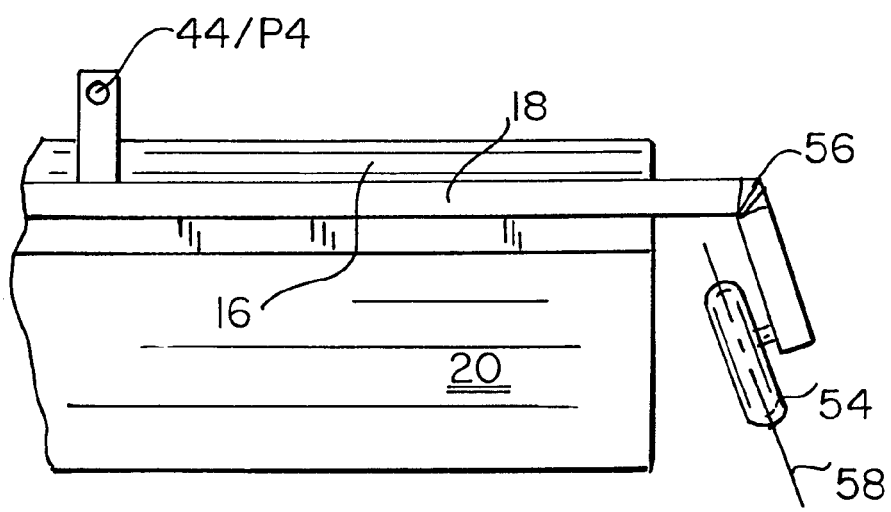
FIG. 8 is a view of FIG. 7 showing an alternative position of the blade rotor.

In FIG. 8 is shown an embodiment of wiper blade 18 in which a pivot point 56 is provided which permits change in the angle of access 58 of the wiper blade relative to side window 20 and which may be used for purposes of cleaning of the blade 18.

Figure 9:
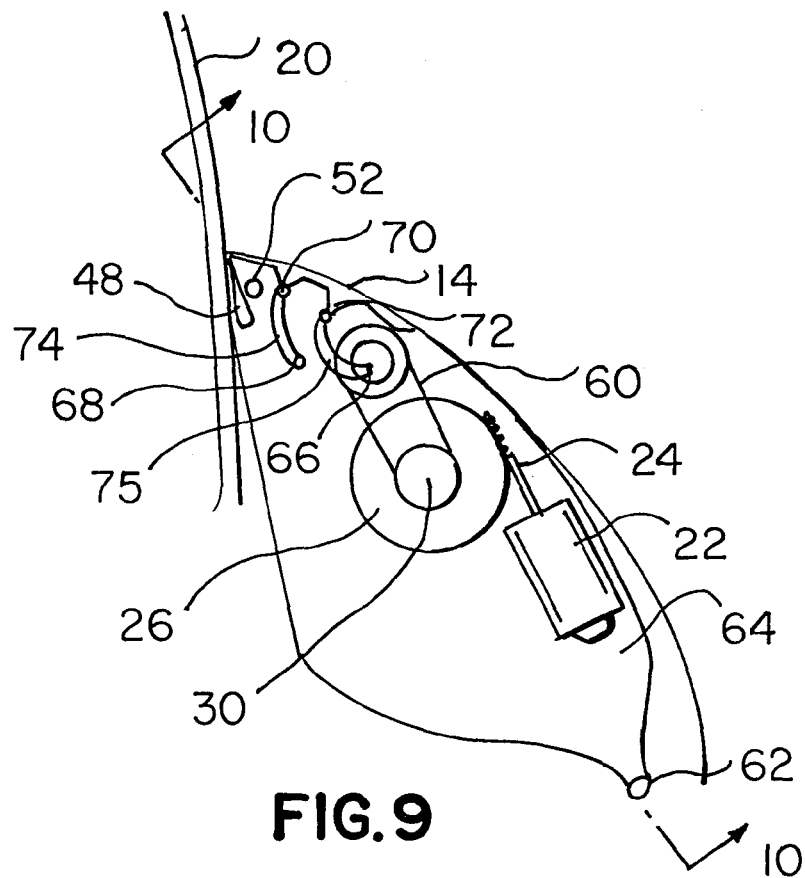
FIG. 9 is a schematic view of a mechanism for opening the hinge panel cover of the wiper.

With reference to FIG. 9, there is shown in schematic view a mechanism for the opening of hinge panel 14 (see FIGS. 1-2) within which the inventive auto side window washing system is stored when the system is not in use. More particularly, shown in FIG. 9 is wiper motor 22 which powers said worm gear 24, which in turn powers said spiral gear 26 and axel or sprocket 30 which powers a wiper cover crank arm 60. This in turn rotates a wiper cover crank drive 76 which, in turn, imparts an angular motion to wiper crank cover 75. This is rotatably attached to said cover crank drive 76 through wiper cover shaft 66. Such rotation of wiper cover crank 75 causes a pivot effect about point 72 which causes rotation of wiper hinge panel 14 about pivot point 70. This, in turn, causes angular displacement of wiper cover control arm 74 which then rotates about said point 70 (see upper portion of FIG. 9). Wiper blade roller 52 is also shown as is wiper bridge 48. Also shown in FIG. 9 is housing drain 52.

Figure 10:
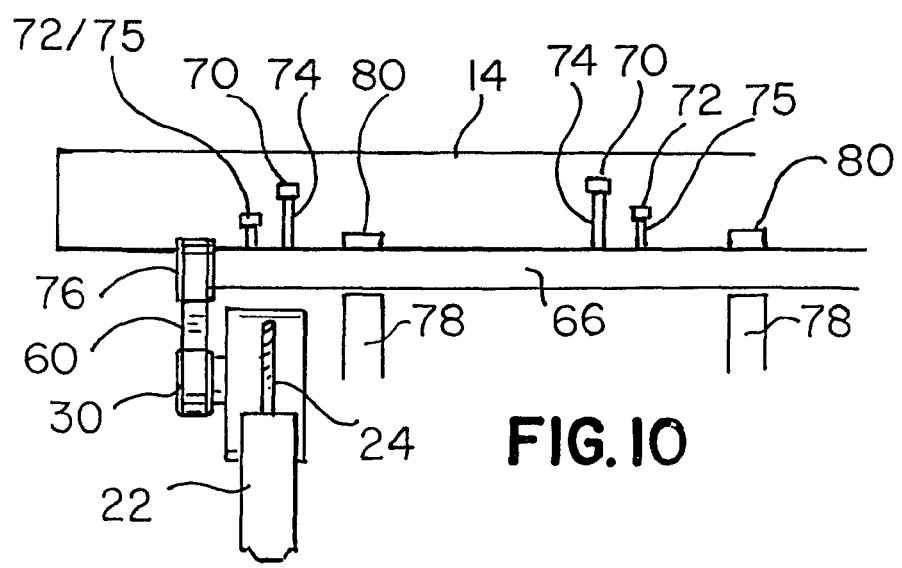
FIG. 10 is a cross-section view taken along Line 10-10 of FIG. 9.

The above mechanism of FIG. 9 may be further appreciated with reference to the cross-sectional view taken along Line 10-10 of FIG. 9, this as is particularly shown in FIG. 10. Therein appear substantially the same reference elements described with respect to FIG. 9 but additionally including wiper cover shaft bracket 78 and shaft support busing 80 (to the right of FIG. 10). As may be noted, wiper cover shaft 66, wiper cover control arm 74/74a and wiper cover crank 75/75a are integral with said shaft 66.

Figure 11:
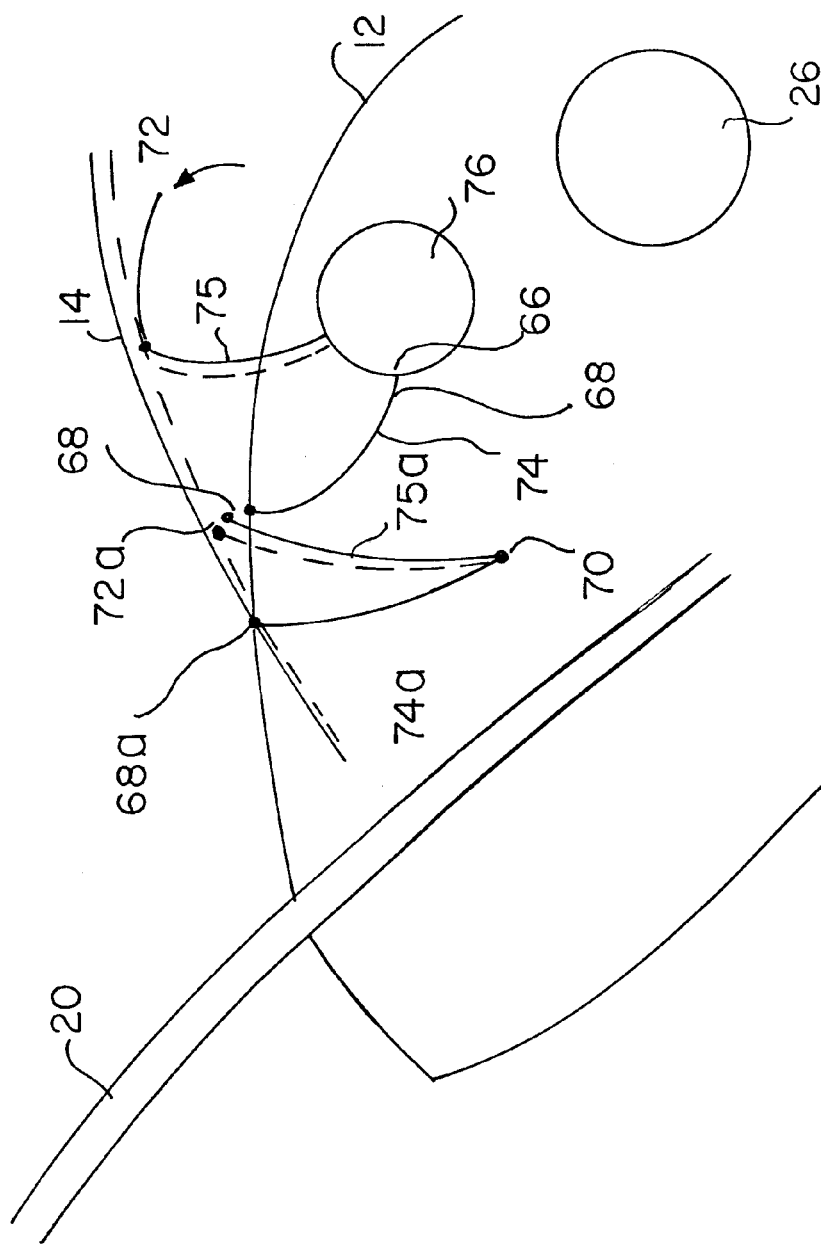
FIG. 11 is a conceptual view of the operation of the latch cover.

Shown in FIG. 11 is an operational view of the mechanism of FIGS. 9 and 10 including the change in position of wiper cover control arm 74/74a and wiper cover crank 75/75a when wiper cover crank drive 76 is pivoted off of pivot points 70 and 72 into the to position of point 72a. Pivot point 68 is rotated into the position of point 68a. This motion results in closure of wiper cover 14, while the reverse sequence of motions effects the opening of wiper cover 14.

Figure 12:
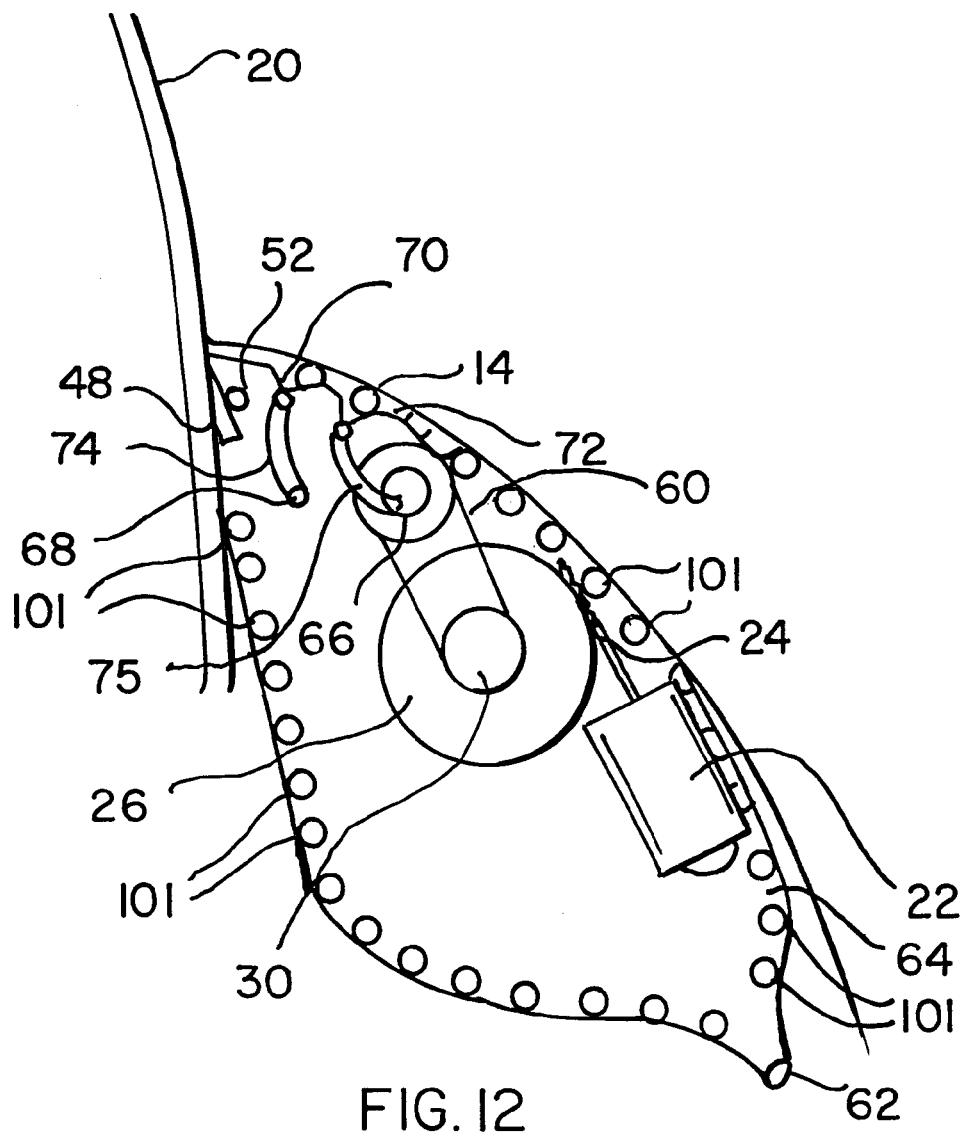
FIG. 12 is a second embodiment of FIG. 9 incorporating a heating element.

Shown in FIG. 12 a second embodiment in which is shown, in schematic view, a mechanism for the opening of hinge panel 14 (see FIGS. 1-2) within which the inventive auto side window washing system is stored when the system is not in use. More particularly, shown in FIG. 9 is wiper motor 22 which powers said worm gear 24, which in turn powers said spiral gear 26 and an axel or sprocket 30 which powers a wiper cover crank arm 60. This in turn rotates a wiper cover crank drive 76 which, in turn, imparts an angular motion to a wiper crank cover 75. This is rotatably attached to said cover crank drive 76 through wiper cover shaft 66. Such rotation of wiper cover crank 75 causes a pivot effect about point 72 which causes rotation of wiper hinge panel 14 about pivot point 70. This, in turn, causes angular displacement of wiper cover control arm 74 which then rotates about said point 70 (see upper portion of FIG. 9). Wiper blade roller 52 is also shown, as is wiper bridge 48. Also shown in FIG. 9 is housing drain 52. In the second embodiment, within said interior of said side door 12 (typically either the driver or passenger side) includes a heating element 101 for use in inclement weather. The heating element, which may be in the form of heating coils, melts snow or ice which then escapes through the housing drain 52. The heating element is preferably connected to the automobile's 10 electronic temperature sensing mechanism to be automatically turned on or off when the temperature drops below a certain level, for instance, freezing. The system may also have its own temperature control for automatic activation of the heating element.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

What is claimed is:

1. An auto side-window washing system, comprising:
   (a) a worm gear having a spiral gear surface, said gear comprising a rotational output of a wiper motor secured to a system platform, said motor including means for reciprocation of the direction of rotation of said output thereof;
   (b) a spiral gear rotationally mounted to a pivot point within said platform and complemental engagement with said spiral gear surface of said worm gear;
   (c) a first rigid linear element secured to said spiral gear along a radius thereof and having an inner end mounted to said pivot point;
   (d) a wiper arm having a first end and a second end, said second end pivotally secured at an outer end of said first rigid element; and
   (e) a second rigid linear element having a first end and a second end, said second end pivotally secured to said wiper arm at a distance from its second end generally equal to a length of said second linear element; and
   (f) an auto window wiper blade pivotally coupled at about a middle thereof to the first end of said wiper arm.

2. The side-window washing system as recited in claim 1, in which said system includes an inner car door mount.

3. The side-window washing system as recited in claim 2, in which said inner car door mount includes an outer cover.

4. The side-window washing system as recited in claim 3, in which said outer cover includes means for electronically opening.

5. The side-window washing system as recited in claim 1, in which said system includes means for washing a side-window.

6. The system as recited in claim 1, in which said first rigid linear element is about equal in length to said second linear element.

7. The system as recited in claim 6, including resilient wheels rotatably attached to respective ends of said wiper blade.

8. The system as recited in claim 7, comprising brackets for securement of said wiper arm and blade with a storage compartment within an auto side door.

9. The system as recited in claim 1, including resilient wheels rotatably attached to respective ends of said wiper blade.

10. The system as recited in claim 9, comprising brackets for securement of said wiper arm and blade with a storage compartment within an auto side door.

11. An auto side-window washing system, comprising:
    (a) a worm gear having a spiral gear surface, said gear comprising a rotational output of a wiper motor secured to a system platform, said motor including means for reciprocation of the direction of rotation of said output thereof;
    (b) a spiral gear rotationally mounted to a pivot point within said platform and complemental engagement with said spiral gear surface of said worm gear;
    (c) a first rigid linear element secured to said spiral gear along a radius thereof and having an inner end mounted to said pivot point;
    (d) a wiper arm having a first end and a second end, said second end pivotally secured at an outer end of said first rigid element; and
    (e) a second rigid linear element having a first end and a second end, said second end pivotally secured to said wiper arm at a distance from its second end generally equal to a length of said second linear element;
    (f) an auto window wiper blade pivotally coupled at about a middle thereof to the first end of said wiper arm; and
    (e) an electric heating element for melting of snow or ice that may otherwise interfere with gear action of the system.

12. The side-window washing system as recited in claim 11, in which said system includes an inner car door mount.

13. The side-window washing system as recited in claim 12, in which said inner car door mount includes an outer cover.

14. The side-window washing system as recited in claim 13, in which said outer cover includes means for electronically opening.

15. The side-window washing system as recited in claim 11, in which said system includes means for washing a side-window.

16. The system as recited in claim 11, in which said first rigid linear element is about equal in length to said second linear element.

17. The system as recited in claim 16, including resilient wheels rotatably attached to respective ends of said wiper blade.

18. The system as recited in claim 17, comprising brackets for securement of said wiper arm and blade with a storage compartment within an auto side door.

19. The system as recited in claim 11, including resilient wheels rotatably attached to respective ends of said wiper blade.

20. The system as recited in claim 19, comprising brackets for securement of said wiper arm and blade with a storage compartment within an auto side door.

* * * * *